Patented June 20, 1939

2,163,065

UNITED STATES PATENT OFFICE 2,163,065

PROCESS OF FERTILIZATION FOR VEGETATION

Ludwig Rosenstein, San Francisco, Calif., assignor to Shell Development Company, San Francisco, Calif., a corporation of Delaware No Drawing. Application October 18, 1937, Serial No. 169,675

1 Claim. (Cl. 47—58)

This invention relates to a method of fertilizing soils by means of irrigation water. For example, normal solid fertilizing materials have been dissolved in irrigation water by the sugar beet growers in the Hawaiian Islands for some time. More recently it has been a practice to add to irrigation water ammonia in small regulated quantities which become combined with salts in the soil forming various soluble compounds useful as plant fertilizers.

Besides fixed nitrogen, vegetation requires other fertilizing materials, among these phosphorus is one of the most important. The phosphorus in the past has been added to the soil in various forms, for example, the various superphosphate fertilizers are well known. The usual commercial fertilizers contain readily soluble phosphates but they soon revert in the soil to less soluble compounds of phosphoric acid. These compounds are still available to the vegetation but they are not so effective for the stimulation of young seedlings or root growth.

Now I have found that by adding small amounts of orthophosphoric acid to irrigation water whereby an extremely dilute solution of orthophosphoric ($H_3PO_4$) acid is formed and then passing said water into contact with soil, very favorable influences on the soil chemistry are produced. For example, insoluble phosphates in the soil such as certain phosphates of aluminum and iron ore, due to the slight acidic condition produced by the orthophosphoric acid, converted into soluble forms. Furthermore, a certain amount of orthophosphoric acid is taken up by the plants as such, and increases the acidity of the plant which is important. It has also been observed that in soils containing amounts of lime that a release of carbon dioxide in the soil is brought about thus exerting a very favorable influence on plant life.

The orthophosphoric acid may be added to the irrigation water from a tank placed on the bank of the irrigation ditch and having a calibrated outlet valve. Pressure may be maintained on the tank to ensure a uniform delivery of the orthophosphoric acid. Having ascertained the number of cubic feet of water to be run to the area and the period over which said run will be made and the amount of orthophosphoric acid to be applied, the flow of the acid can be regulated to ensure the desired quantity is delivered to the water. It must be realized that the amount of orthophosphoric acid added to the soil as such by means of the irrigation water will depend upon the prior analysis of the soil being treated. Too much phosphoric acid will cause an over-acid condition of the soil with disastrous effects.

The following is an example of application of orthophosphoric acid to irrigation water.

Irrigation water was fed to the land through an open ditch and the liquid orthophosphoric acid allowed to drip into the flowing stream of water at such a rate that a concentration of liquid orthophosphoric acid of approximately 42 parts phosphoric acid per million parts of water was produced. This slightly acidic water was then led into furrows and was absorbed by the soil. Contrary to expectations the phosphoric acid was not removed from the water as it flowed through the irrigation ditch and furrows; the concentrations of acid in the water as ascertained by sampling remained substantially uniform throughout.

While in the above example I have given a specific concentration of orthophosphoric acid, I do not intend to limit myself thereto as amounts up to one thousand parts of phosphoric acid to one million parts of water may be added in certain cases. Other methods of adding the orthophosphoric acid to the water may be used as will be apparent.

I claim as my invention:

Process for fertilizing soils comprising passing orthophosphoric acid into irrigation water in such amounts that the concentration of phosphoric acid in said water does not exceed 43 parts per million and thereafter passing said water into contact with vegetation.

LUDWIG ROSENSTEIN.